US012553388B2

(12) United States Patent
Leonov

(10) Patent No.: US 12,553,388 B2
(45) **Date of Patent: *Feb. 17, 2026**

(54) PLASMA INJECTION MODULES

(71) Applicant: University of Notre Dame du Lac, South Bend, IN (US)

(72) Inventor: Sergey B. Leonov, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/954,263

(22) Filed: Nov. 20, 2024

(65) Prior Publication Data

US 2025/0084994 A1 Mar. 13, 2025

Related U.S. Application Data

(63) Continuation of application No. 18/347,075, filed on Jul. 5, 2023, now Pat. No. 12,173,902, which is a (Continued)

(51) Int. Cl.
*F02C 7/264* (2006.01)
*F23Q 13/00* (2006.01)

(52) U.S. Cl.
CPC .............. *F02C 7/264* (2013.01); *F23Q 13/00* (2013.01); *F23R 2900/00008* (2013.01); *F23R 2900/00009* (2013.01)

(58) Field of Classification Search
CPC .. F23R 2900/00008; F23R 2900/00009; F23Q 13/00; F05D 2270/172; F02C 7/264; F02C 7/266; F02C 7/26
See application file for complete search history.

(56) References Cited

U.S. PATENT DOCUMENTS 5,377,633 A 1/1995 Wakeman
5,640,841 A 6/1997 Crosby
(Continued)

FOREIGN PATENT DOCUMENTS

CA 2779568 A1 6/2011
EP 2672086 A2 12/2013

OTHER PUBLICATIONS

Bane et al., "Plasma diagnostics in forefront of research", Aerospace Sciences, <https://aerospaceamerica.aiaa.org/year-in-review/plasma-diagnostics-in-forefront-of-research/>, 2018, 4 pages.
(Continued)

*Primary Examiner* — Gerald L Sung
(74) *Attorney, Agent, or Firm* — Michael Best & Friedrich LLP

(57) ABSTRACT

A plasma injection module includes a fuel receiving end, a discharge end opposite the fuel receiving end, and an axial fluid pathway extending between the fuel receiving end and the discharge end. An insulator assembly defines a first portion of the axial fluid pathway proximate to the fuel receiving end. An injection tube assembly having a permanent magnet is positioned downstream of the insulator. A voltage input connection is arranged downstream of the insulator assembly and upstream of the injection tube assembly. The voltage input connection secures a voltage source to the injection tube to form a plasma filament within and adjacent to the axial fluid pathway. During operation a permanent magnet produces a magnetic field that interacts with the plasma filament to rotate the plasma filament and increase an area of ignition between the plasma filament and the combustible material at the discharge end.

20 Claims, 9 Drawing Sheets

Related U.S. Application Data continuation of application No. 17/172,311, filed on Feb. 10, 2021, now Pat. No. 11,739,937.

(60) Provisional application No. 62/975,134, filed on Feb. 11, 2020.

(56) References Cited

U.S. PATENT DOCUMENTS

| | | | |
|---|---|---|---|
| 7,059,249 B2 | 6/2006 | Chaboki et al. | |
| 7,571,598 B2 | 8/2009 | O'Brien et al. | |
| 8,371,104 B2 | 2/2013 | Wells et al. | |
| 12,173,902 B2 * | 12/2024 | Leonov | F23Q 13/00 |
| 2010/0186414 A1 | 7/2010 | Lugg | |
| 2014/0137840 A1 | 5/2014 | McAlister | |
| 2015/0013650 A1 | 1/2015 | McAlister | |
| 2019/0345895 A1 | 11/2019 | Rathay et al. | |

OTHER PUBLICATIONS

Firsov et al., "Plasma-enhanced mixing and flameholding in supersonic flow", Philosophical Transactions A, vol. 373, 2015, 16 pages.
Klementyeva et al., "Experimental Study of Electrical Discharges in Gas Flows under External Magnetic Field", High Temperature, vol. 49, No. 6, 2011, pp. 788-796.
Leonov et al., "Ethylene Ignition and Flameholding by Electrical Discharge in Supersonic Combustor", Journal of Propulsion and Power, vol. 34, No. 2, 2018, pp. 499-509.
Leonov, "Review: Electrically Driven Supersonic Combustion", Energies, vol. 11, 2018, pp. 1-35.
O'Briant et al., "Review: laser ignition for aerospace propulsion", Propulsion and Power Research, vol. 5, No. 1, 2016, pp. 1-21.

* cited by examiner

PLASMA INJECTION MODULES

CROSS-REFERENCE TO RELATED APPLICATION(S)

This application is a continuation of U.S. patent application Ser. No. 18/347,075, filed on Jul. 5, 2023, which is a continuation of U.S. patent application Ser. No. 17/172,311, filed on Feb. 10, 2021, now issued as U.S. Pat. No. 11,739,937 on Aug. 29, 2023, which is related to and claims the priority benefit of U.S. Provisional Patent Application No. 62/975,134, filed on Feb. 11, 2020, each of which are incorporated herein by reference in their entirety.

TECHNICAL FIELD

The present disclosure relates to advanced fuel injection systems. In particular, the disclosure relates to fuel injection systems for synergistic fuel injection, ignition, and flame maintenance.

INTRODUCTION

Ignition is defined as the transformation process of a combustible material from an unreactive state to a self-propagating state. Ignition can be summarized in three successive stages: (1) the igniter (spark in conventional systems) creates initial conditions for chemical energy release. The initial break-down phase results in a microsecond scale electrically conducting channel, followed by a glow discharge phase which deposits most of the energy. The after-spark zone of gas is fully or partially ionized and contains a pool of highly reactive chemical species. (2) Then the flame develops depending on the initiation of the chemical reactions, which determines whether or not the transition from a kernel of hot gas to a self-sustained flame kernel is possible. (3) The final step of ignition is flame kernel propagation, which leads to flame growth and wrinkling.

A basic fuel injection/ignition system for high-speed combustors is illustrated in FIGS. 1*a* and 1*b*. The fuel injection/ignition system typically includes a flame holding structure having a fuel port that receives a combustible material, an ignition source, and a recessed cavity for mixing the combustible material with oxidizer at presence of the ignition source to allow the combustible material to ignite (FIG. 1*b*).

The use of plasma for fuel ignition and flame holding (in a high-speed environment) has seen increased interest because of plasma's potential to enhance operational stability, make ignition a more reliable process, and reduce total pressure losses under certain flow conditions without the need for mechanical flame holding structures. Plasma-based methods offer great advantages in fuel ignition time and flame stability over conventional methods, such as a pilot flame in a cavity or conventional spark plug ignition.

FIG. 2 illustrates a typical flow structure at fuel injection into supersonic crossflow. In the illustrated embodiment, the fuel injection system 10, includes a combustor that has a metal wall 14 having a fuel injection port 18. Many fuel injection systems, used in supersonic combustors, commonly utilize a subsonic recirculation region known as a flameholder, typically a rear-facing cavity or a wall-step. This is to overcome the orders of magnitude difference in flame propagation speed (order 1 m/s) and flow velocity (order 500 m/s and greater depending on flight Mach number). As the fuel jet interacts with a supersonic crossflow 26, a bow shock 34 is formed which causes an upstream boundary or mixing layer 38 to separate. As such, the mixing layer 38 is formed—which is the area for the fuel and the oxidizer to mix downstream of the fuel outlet 18 at a subsonic velocity. Additionally, in case of high temperature core flow, the bow shock 34 forms autoignition zones with an increased heat release rate. If the heat release rate is too high, dynamic instabilities or choking may occur. Therefore, the fuel injection system illustrated in FIG. 2, uses the supersonic airflow 26 to ignite the combustible material. To increase the mixing, the design typically includes fuel injection struts (not shown). The struts' interaction with supersonic airflow leads to a complex 3D shock wave structure, which impacts the pressure losses, which is increasingly evident at higher velocities.

With reference to FIGS. 3*a* and FIG. 3*b*, a fuel injection system 40 that uses a plane wall 44 (e.g., no cavity flame holder) is illustrated. The fuel injection system 40 includes a fuel port 48 in the plane wall 44 and a high voltage electrode array 52 is positioned proximate the fuel port 48 on the wall 44. The high voltage electrode array 52 generates plasma filaments 54 that interact with a fuel jet entering a supersonic crossflow 26 through the fuel port 48.

The high voltage electrodes 52 may be positioned in front of (upstream, as shown in FIG. 3*a*) or behind (downstream, as shown in FIG. 3*b*) the fuel port 48 with respect to the supersonic crossflow 26. As such, there is limited control for the fuel-oxidizer interaction, mixing, and ignition. This may cause lags in ignition of the fuel and/or inefficient mixing of the fuel and oxidizer.

SUMMARY

In one aspect, a plasma injection module comprises a fuel receiving end configured to receive a combustible material, a discharge end opposite the fuel receiving end, an axial fluid pathway extending between the fuel receiving end and the discharge end, an insulator assembly defining a first portion of the axial fluid pathway proximate to the fuel receiving end, and an injection tube assembly positioned downstream of the insulator assembly. The injection tube assembly coupled to the insulator assembly, the injection tube assembly including an injection tube defining a second portion of the axial fluid pathway adjacent to the discharge end, the injection tube formed of an electrically conductive material and a nozzle surrounding the injection tube, the nozzle defining a fuel discharge opening proximate the discharge end. A voltage input connection arranged between the insulator assembly and the injection tube assembly, the voltage input connection being configured to secure a voltage source to the injection tube to form a plasma filament within and adjacent to the axial fluid pathway and a flow inducing device coupled to the injection tube proximate to the discharge end.

In another aspect, a plasma injection module comprises a fuel receiving end configured to receive a combustible material, a discharge end opposite the fuel receiving end, an axial fluid pathway extending between the fuel receiving end and the discharge end, an insulator assembly defining a first portion of the axial fluid pathway proximate to the fuel receiving end, a connection assembly positioned downstream of the insulator assembly and defines a second portion of the axial fluid pathway, and an injection tube assembly positioned downstream of the insulator and connection assembly. The injection tube assembly coupled to the insulator assembly via the connection assembly, the injection tube assembly including an injection tube defining a third portion of the axial fluid pathway adjacent to the discharge end, the injection tube formed of an electrically conductive material, a permanent magnet arranged annularly about the injection tube proximate to the discharge end, and a nozzle surrounding the injection tube and the permanent magnet, the nozzle defining a fuel discharge opening proximate the discharge end. A voltage input connection arranged downstream of the insulator assembly and the connection assembly and upstream of the injection tube assembly, the voltage input connection being configured to secure a voltage source to the injection tube to form a plasma filament within and adjacent to the axial fluid pathway.

In another aspect, an ignition system comprises a combustor having one or more fuel ports positioned on a flowside wall, and a plasma injection module coupled to the combustor. The plasma injection module comprising a fuel receiving end configured to receive a combustible material, a discharge end opposite the fuel receiving end, the discharge end being positioned proximate the flowside wall, an axial fluid pathway extending between the fuel receiving end and the discharge end, an insulator assembly defining a first portion of the axial fluid pathway proximate to the fuel receiving end, and an injection tube assembly positioned downstream of the insulator assembly. The injection tube assembly coupled to the insulator assembly, the injection tube assembly including an injection tube defining a second portion of the axial fluid pathway adjacent to the discharge end, the injection tube formed of an electrically conductive material and a nozzle surrounding the injection tube, the nozzle defining a fuel discharge opening proximate the discharge end. A voltage input connection arranged between the insulator assembly and the injection tube assembly and a flow inducing device coupled to the injection tube proximate to the discharge end.

Other aspects of the disclosure will become apparent by consideration of the detailed description and accompanying drawings.

DETAILED DESCRIPTION

The present disclosure is related to plasma injection modules. In some implementations, exemplary plasma injection modules can act as a fuel injection system and advanced ignition system simultaneously. Exemplary configurations disclosed can enable combustible materials or reactive mixtures to share a common path with a plasma filament generated by a high voltage source. Exemplary plasma injection modules can include a long plasma zone that allows plasma-reactive mixture interaction, an extended volume of initial kernel, and/or provide higher probability of self-sustained flame holding, especially under non-optimal conditions.

In the present disclosure, plasma injection modules are disclosed that can improve ignition and mixing of a combustible material compared to the case of standard transverse fuel injection illustrated in FIG. 1, FIG. 2, FIG. 3*a*, and FIG. 3*b*. Exemplary plasma injection modules can generate the plasma filament collocated with the fuel jet. Additionally, exemplary plasma injection modules can include permanent magnets that produce an axial magnetic field which causes the plasma filament to rotate about the axis of the injector. This rotation of the plasma filament increases the volumetric region exposed to the plasma filament which increases mixing, increases the size of an ignition kernel, and increases the volume containing highly reactive radicals. Highly reactive radicals represent chemically active species including molecules or atoms in electronically or vibrationally excited states. These reactive radials normally do not exist in the gas. The plasma filaments rotation also reduces the heat loads on the materials of the plasma injection module.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. The materials, methods, and examples disclosed herein are illustrative only and not intended to be limiting.

The terms "comprise(s)," "include(s)," "having," "has," "can," and variants thereof are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising" and "consisting essentially of," the embodiments or elements presented herein, whether explicitly set forth or not.

Exemplary Plasma Injection Module

Figure 4:
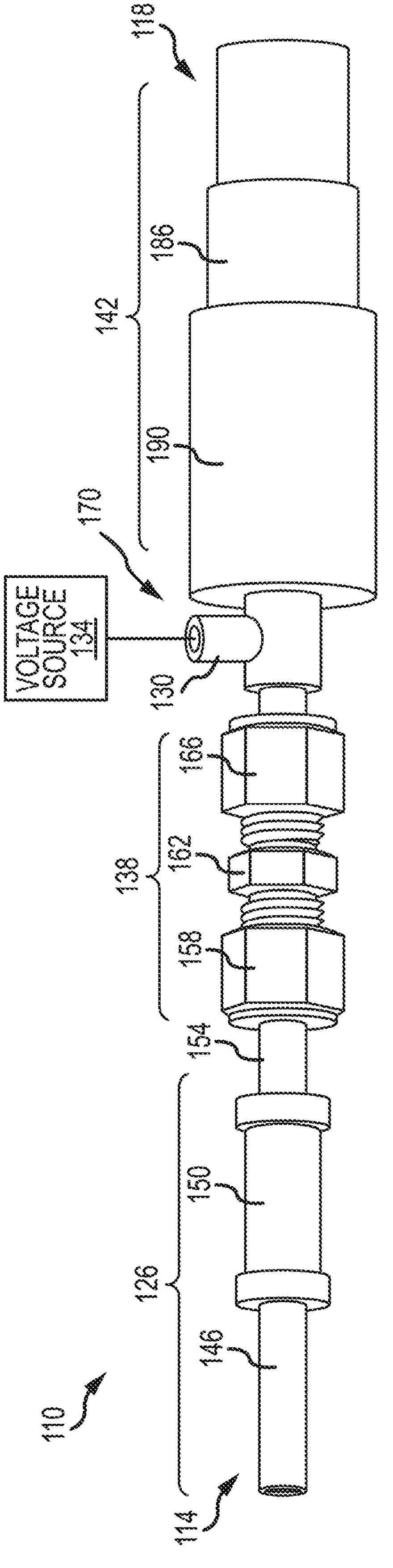
FIG. 4 is a perspective view of an exemplary plasma injection module according to the present disclosure.
Figure 5:
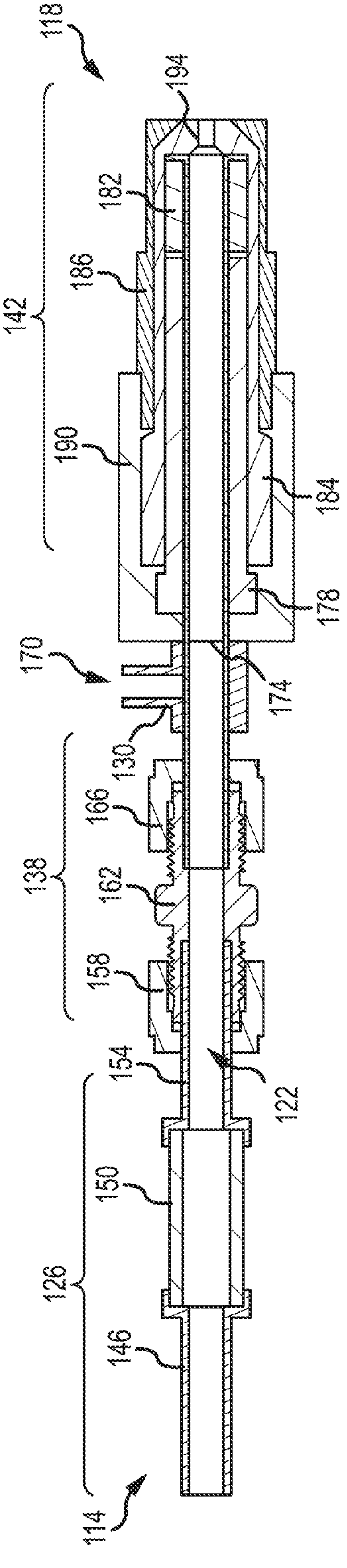
FIG. 5 is a side, cross-sectional view of the plasma injection module shown in FIG. 4.
Figure 6:
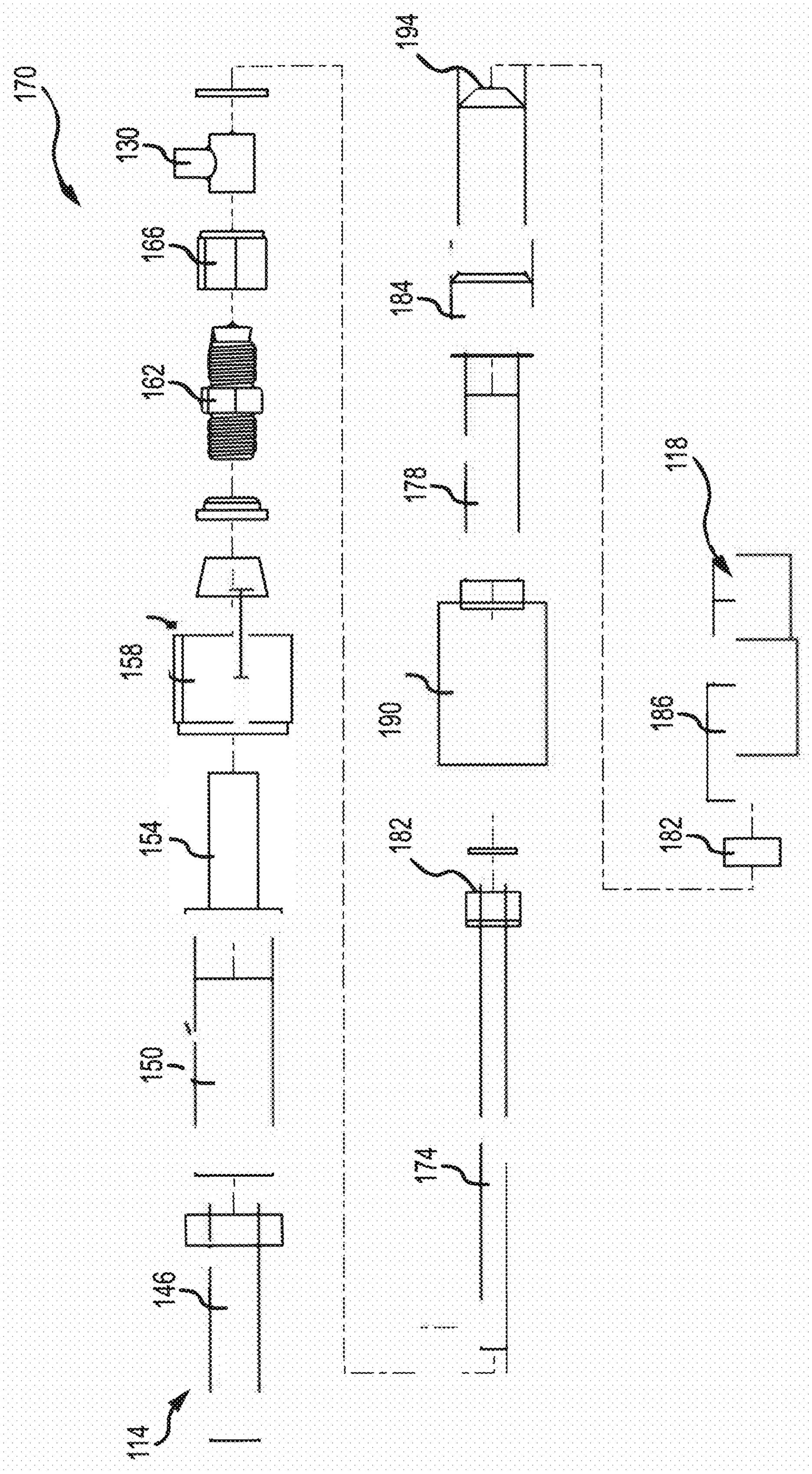
FIG. 6 is a side exploded view of the plasma injection module shown in FIG. 4.

FIGS. 4-6 illustrate a plasma injection module 110 having a fuel receiving end 114, a discharge end 118 opposite the fuel receiving end 114, and an axial fluid pathway 122 extending between the fuel receiving end 114 and the discharge end 118. The plasma injection module 110 may be used as an injection source in various locations and applications. For example, the plasma injection module 110 may be used in a supersonic combustor (e.g., a scram jet) and may be installed on a plane wall, inside of a flameholding cavity or combustor, described in detail below, in vicinity of fuel injecting struts, etc. The plasma injection module 110 is configured to receive a combustible material or reactive mixture, such as gaseous hydrocarbon fluids (e.g., ethylene, hydrogen, methane, mixtures of gaseous hydrocarbons, etc.) and other fluids such as air, oxygen, and liquid or vaporized liquid fuels like Jet A or JP-8.

The illustrated plasma injection module 110 includes an insulator assembly 126, a voltage input connection 130 configured to receive an electric current from high-voltage power supply source 134 (schematically illustrated in FIG. 3), an injection tube assembly 142 positioned downstream of the voltage input connection 130, and a connection assembly 138. The connection assembly 138 extends between and couples the insulator assembly 126 to the voltage input connection 130 and to the injection tube assembly 142.

The insulator assembly 126 includes a first connection sleeve 146 configured to receive the combustible or other injectable material, an insulator 150 coupled to and downstream of the first connection sleeve 146, and a second connection sleeve 154 coupled to and downstream of the insulator 150. The first and second connection sleeves 146, 154 may be constructed of metals capable of tolerating high temperature applications (e.g., steel, aluminum, etc.). The insulator 150 may be constructed of a ceramic material (Alumina, Macor™, Shapal™, etc.) to provide insulation between the combustible material entering the receiving end 114 of the plasma injection module 110 and the voltage source 134.

In the illustrated embodiment, the insulator 150 is formed to have cylindrical construction that defines a portion of axial fluid pathway 122 upstream of the voltage source 134. The cylindrical construction of the plasma injection module 110 allows the plasma injection module 110 to be inserted within combustors, such as the SBR-50 combustor 200 illustrated in FIG. 7.

In some embodiments, the use of high temperature rated connection sleeves 146, 154 provides cost efficient connection portions for the plasma injection module 110 to be connected to a fuel line, and for the insulator assembly 126 to be connected to the connection assembly 138 upstream of the voltage input connection 130. In other embodiments, the insulator assembly 126 may be formed by a single insulator that defines the fuel receiving end 114 and is able to be connected to the connection assembly 138.

In the illustrated embodiment, the connection assembly 138 is a compression fitting having a compression ring that surrounds the second connection sleeve 154, a compression nut 158 coupled to the second connection sleeve 154, a connection seat 166, and a connection tube 162 coupling the compression ring to the connection seat 166. The connection assembly 138 operably couples the insulator assembly 126 to the voltage input connection 130 and the injection tube assembly 142. In other embodiments, various connection assemblies may be used to couple the insulator assembly 126 to the voltage input connection 130 and the injection tube assembly 142.

The voltage connection input 130 includes a voltage input aperture 170 that is configured to receive the voltage source 134. For example, the voltage source 134 may be a wire that extends through the voltage input aperture 170 and wraps around an injection tube 174 of the injection tube assembly 142. The injection tube 174 acts as an electrode to allow the voltage source 134 to produce a plasma filament. The voltage source 134 may produce a voltage in the range of approximately 3 kilovolts (kV) to 6 kV to generate the plasma filament. Other voltages are contemplated. In the illustrated embodiment, the voltage input aperture 170 is positioned approximately transverse the axial fluid pathway 122. In other embodiments, the voltage input aperture 170 may intersect the axial fluid pathway 122 at any angle and the voltage magnitude may be different from described above.

The injection tube assembly 142 includes the injection tube 174, a first insulating tube 178, one or more flow inducing devices or permanent magnets 182, a second insulating tube 184, a sleeve 186 (e.g., a metal sleeve), and a containment cap or tube 190. The injection tube 174 is coupled to the compression ring and connection seat 166 of the connection assembly 138. The voltage input connection 130 is coupled to the injection tube 174 between the containment cap 190 and the connection assembly 138 to secure the voltage input connection 130 downstream of the insulator assembly 126 and upstream the injection tube assembly 142. In the illustrated embodiment, the injection tube 174 is constructed of a material that has a high thermal and electric conductivity (e.g., copper, brass, etc.).

The injection tube 174 can act as an electrode for the voltage source 134 connected to voltage input connection 130 and forms a portion of the axial fluid pathway 122 within the injection tube assembly 142. The fuel receiving end 114 is constructed to electrically separate the high voltages within the plasma injection module 110 and the metal components related to the fuel supply.

Figure 10:
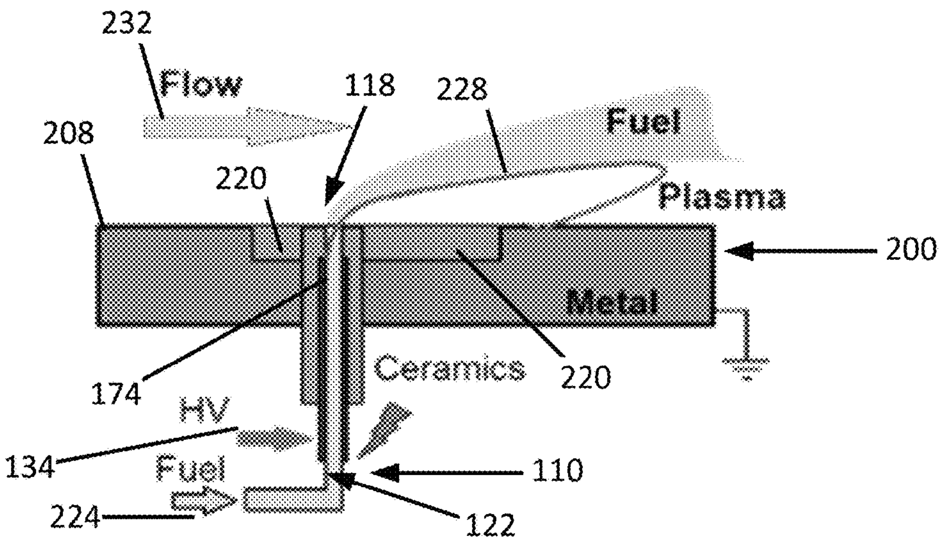
FIG. 10 is a schematic view of the plasma injection module of FIG. 4 in operation.

When the voltage source 134 is on, the plasma filament (228 in FIG. 10) is formed on an outer diameter of the injection tube 174 and interacts with the combustible material to generate a highly reactive material adjacent the discharge end 118. That is, the plasma filament is formed within and adjacent to the axial fluid pathway 122 and the plasma filament may extend between the axial fluid pathway 122 and a grounded metal wall outside of the plasma injection module 110, as 228 is shown in FIG. 10.

The first insulating tube 178 surrounds the injection tube 174 and is formed of a non-conductive material. For example, the first insulating tube 178 may be formed of ceramic material similar to the insulator 150. The first insulating tube 178 is sized to surround a portion of the injection tube 174 and engage with the containment cap 190.

In the illustrated embodiment, the flow inducing device is formed as one or more permanent magnets 182 that are constructed as cylindrical magnets that surround the injection tube 174 and engage the first insulating tube 178 adjacent to the discharge end 118 of the plasma injection module 110. The one or more permanent magnets 182 introduce an external magnetic field to the plasma filament, which produces a force that causes the plasma filament to rotate around the axis of the injection tube 174. The rotation of the plasma filament prevents the plasma filament from maintaining a single connection point of contact between the voltage source and a grounded side (e.g., the combustor) which reduces the heating and evaporation of metal. The rotation also increases the volume of gas exposed to the plasma filament since the plasma rotation happens on a time scale comparable or smaller than the local flow.

As such, the use of an external magnetic field allows the plasma injection module 110 to influence the length and rotation of the plasma filament to reduce heating and increase the volume of gas which interacts with the plasma filament. In some constructions, the magnets may be neodymium grade 52 permanent magnets. In other embodiments, other types of magnets such may be used to induce the external magnetic field on the filamentary plasma without adding substantial weight to the plasma injection module. In some embodiments, the axial fluid pathway 122 of the plasma injection module may include a mechanical element that provides a tangential component to the movement of combustible fluid to produce a swirling pattern in a flow field of the combustible fluid. The mechanical element may be used in place of the magnets 182 or in conjunction with the magnets 182.

The second insulating tube 184 is sized to surround the first insulating tube 178 and the one or more permanent magnets 182. The second insulating tube 184 may be formed of a ceramic material similar to the insulator 150 and the first insulating tube 178. The sleeve 186 is sized to surround the second insulating tube 184. The second insulating tube 184 includes a fuel discharge opening or nozzle 194 positioned adjacent the discharge end 118 of the plasma injection module 110.

The nozzle 194 may include a geometry that enhances or suppresses certain characteristics of the flow of the plasma filament and the combustible material during mixing and ignition of the combustible material (e.g., mass flow rate, flow velocity, etc.). In the illustrated embodiment, the nozzle 194 is formed as a portion of the second insulation tube 184 and is tapered to form an end of the axial fluid pathway 122. In other embodiments, the nozzle 194 may be a separate component of different geometry (e.g., a different profile to promote a desired flow pattern, such as a supersonic jet or swirling flow with a significant tangential component of the gas velocity) that is secured to the second insulating tube 184 or the sleeve 186.

The sleeve 186 is configured to couple to the containment cap 190 to secure the first insulating tube 178, the permanent magnets 182, the second insulating tube 184, and metal sleeve 186 to injection tube 174 relative to each other. For example, the metal sleeve 186 may have a threaded outer diameter that engages with a threaded inner diameter of the containment cap 190. In other embodiments, other connection methods may be used.

During assembly of the plasma injection module 110, the insulator assembly 126, connection assembly 138, the voltage input connection 130, and the injection tube assembly 142 are received or provided. The insulator assembly 126 defines a fuel receiving end of the plasma injection module and a first portion of the axial fluid pathway 122. The insulator assembly 126 is coupled to the connection assembly 138. The voltage input connection 130 is coupled to the injection tube 174 of the injection tube assembly 142. The injection tube 174 is coupled to the connection assembly 138 so the voltage input connection 130 is downstream the insulator assembly 126. The injection tube forms a second portion of the axial fluid pathway 122. The containment cap 190, the first insulating tube 178, the permanent magnet 182, the second insulating tube 184, the sleeve 186, and the nozzle 194 are sequentially coupled to the injection tube 174. More specifically, the first insulating tube 178 is coupled to the injection tube 174 and positioned inside the containment cap 190 to surround the injection tube 174. The one or more permanent magnets 182 are coupled to the injection tube 174 adjacent to the first insulating tube 178 and the discharge end 118 of the plasma injection module 110. The second insulating tube 184 is coupled to the injection tube 174 so the second insulating tube 184 surrounds and encloses the first insulating tube 178 and the one or more permanent magnets 182. In the illustrated embodiment, the nozzle 194 is a portion of the second insulating tube 184. In other embodiments, a separate nozzle may be coupled to the assembly. It should be appreciated that coupling the nozzle 194 to the plasma assembly may incorporate either construction. The sleeve 186 is coupled to the injection tube 174 so the sleeve 186 surrounds the second insulating tube 184. The metal sleeve 186 configured to be securable to the containment cap 190 to secure the first insulating tube 178, the permanent magnets 182, and the second insulating sleeve 184 to define the injection tube assembly 142 downstream of the voltage connection input 130.

Exemplary Combustor for Plasma Injection Modules

Figure 8:
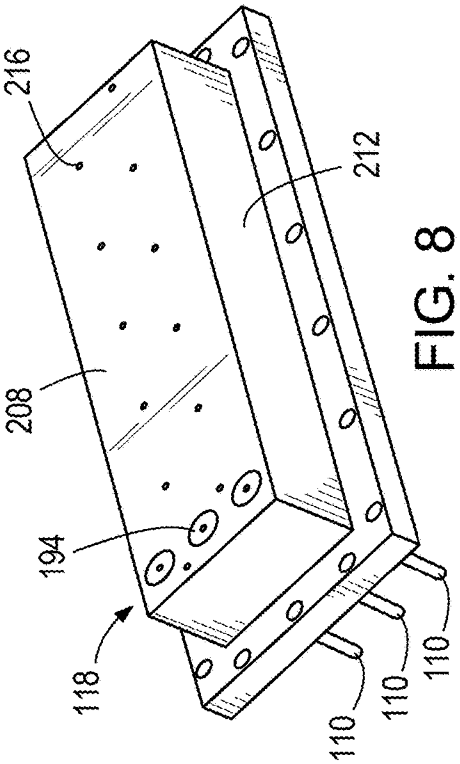
FIG. 8 is a perspective flowside view of the assembly shown in FIG. 7.
Figure 7:
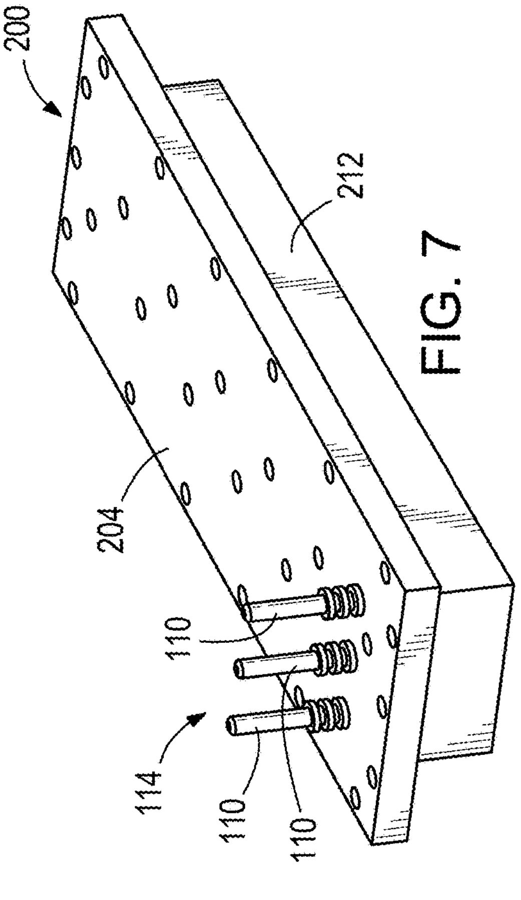
FIG. 7 is a perspective outside view of an example plasma injection module, coupled to test section insert for SBR-50 at the University of Notre Dame which emulates a supersonic combustor, according to an embodiment of the present disclosure.
Figure 9:
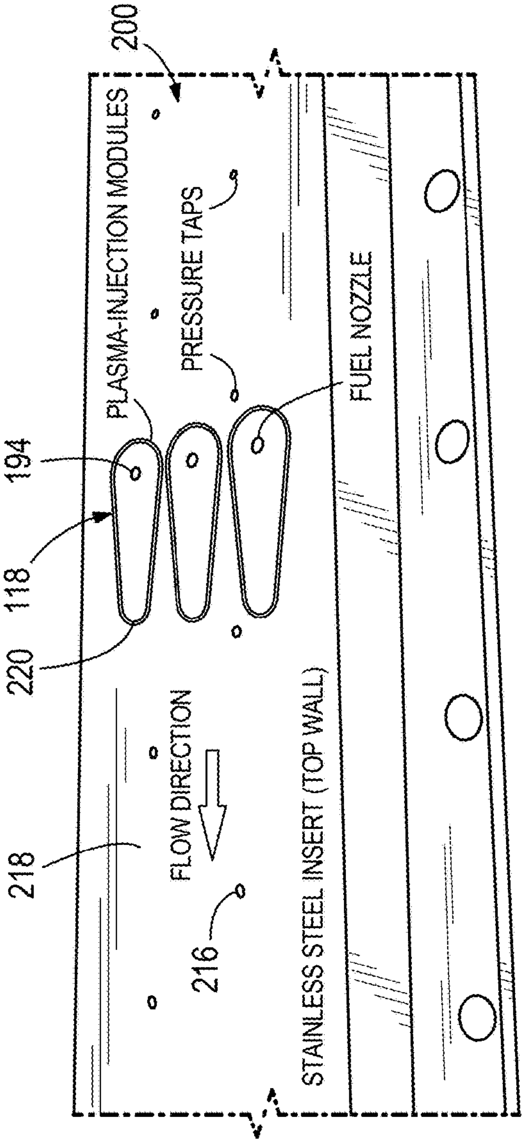
FIG. 9 is a flowside photographic image of the plasma injection module coupled to the SBR-50 insert's wall according to an embodiment of the present disclosure.

With reference to FIGS. 7-9, a non-limiting application of the plasma injection module is illustrated. The plasma injection module 110 is coupled to an experimental combustor 200 using an insert for SBR-50 at the University of Notre Dame having a flowside wall 208 without flame holding cavity, side walls 212, an opposing wall 204 opposite the flowside wall 208, and pressure taps 216 positioned on the flowside wall 208. A plurality of plasma injection modules 110 are inserted within a plurality of fuel ports on the SBR-50 insert 200 such that the fuel receiving end 114 of the plasma injection module 110 extends from the opposing wall 204 of the combustor 200 and the nozzle 194 and the discharge end 118 of the plasma injection module is flush with the flowside wall 208. In some embodiments, the nozzle 194 of the plasma injection module 110 may be inserted within a ceramic insert 220 that has an obligated cross section (FIG. 8). The ceramic insert 220 allows for the plasma filament to travel a distance along the ceramic insert 220 before the plasma filament interacts with the top wall 208 to form a ground.

FIG. 9 illustrates a schematic of the plasma injection module 110 operably coupled to the SBR-50 combustor 200. During operation of the plasma injection module 110, the first connection sleeve 146 (FIG. 5) is coupled to a fuel line 224 that receives a combustible material. The combustible material moves through the axial fluid pathway 122 of the plasma injection module 110. The high voltage source 134 introduces a plasma filament 228 to the axial fluid pathway 122 via the voltage connection input 130.

Once the plasma filament 228 (FIG. 10) and the combustible fuel enters the injection tube assembly 142, the one or more permanent magnets 182 (FIG. 5) introduce an external magnetic field which produces a force on the plasma filament 228 to cause the plasma filament 228 to rotate. The rotation increases the volume of combustible material exposed to the plasma filament 228 since the plasma rotation happens on a time scale comparable or smaller than the local flow. As a result, the plasma filament 228 and combustible material begins mixing to generate a highly reactive material adjacent the discharge end 118 of the plasma injection module 110. The generation of the highly reactive material increases the efficiency of ignition and combustion before the plasma filament 228 and the combustible material are introduced to a supersonic crossflow 232 with oxidizer.

As illustrated in FIG. 10, the plasma filament 228 enters the axial fluid pathway 122 adjacent the discharge end 118 and is generating the highly reactive material. The highly reactive material interacts with the supersonic flow 232 and forms a recirculation zone for ignition along the flowside wall 208. For example, the plasma filament may couple to a local flow region during transverse injection into the supersonic flow 232 to elongate the length of the plasma filament 228 in a downstream direction from the discharge end 118. In some embodiments, the length of the plasma 228 may elongation to a distance greater than 100 millimeters from the discharge end 118. Once the plasma filament 228 reaches an end portion of the ceramic insert 220, the plasma filament 228 grounds on the top wall 208 of the combustor 200. The plasma filament 228 formed by the plasma injection module 110 locates within the mixing layer of the injection tube 174 which increases the ability to ignite and combust the highly reactive material.

Methods of Use

Exemplary plasma injection modules may be used within a flameholding cavity, on a plane wall, behind mixing components, or the like. An exemplary operation of plasma injection module 110 operating within apparatus as shown in FIGS. 7-9 is discussed below.

During an exemplary operation of the plasma injection module 110, the first connection sleeve 146 is coupled to a fuel line that receives a combustible material. The combustible material moves through the axial fluid pathway 122 of the plasma injection module 110. The high voltage source 134 introduces a plasma filament to the axial fluid pathway 122 via the voltage connection input 130. The combination of the plasma injection module 110 and the combustor forms an ignition system that increases an area of ignition between the combustible fuel and the plasma filament.

Once the plasma filament and the combustible fuel enters the injection tube assembly 142, the one or more permanent magnets 182 (FIG. 5) generates an external magnetic field and produces a force on the plasma filament to cause the plasma filament to rotate. In other embodiments, an alternative flow inducing device may cause the plasma filament to rotate. The rotation increases the volume of combustible material exposed to the plasma filament because the plasma rotation happens on a time scale comparable or smaller than the local flow. As a result, the plasma filament 228 and combustible material begin mixing to generate a highly reactive material adjacent the discharge end 118 of the plasma injection module 110. The generation of the highly reactive material decreases the ignition time and increases the efficiency combustion.

EXAMPLES

The construction and methods of the disclosure may be better understood by reference to the following examples, which are intended as an illustration of and not a limitation upon the scope of the disclosure.

Figure 11:
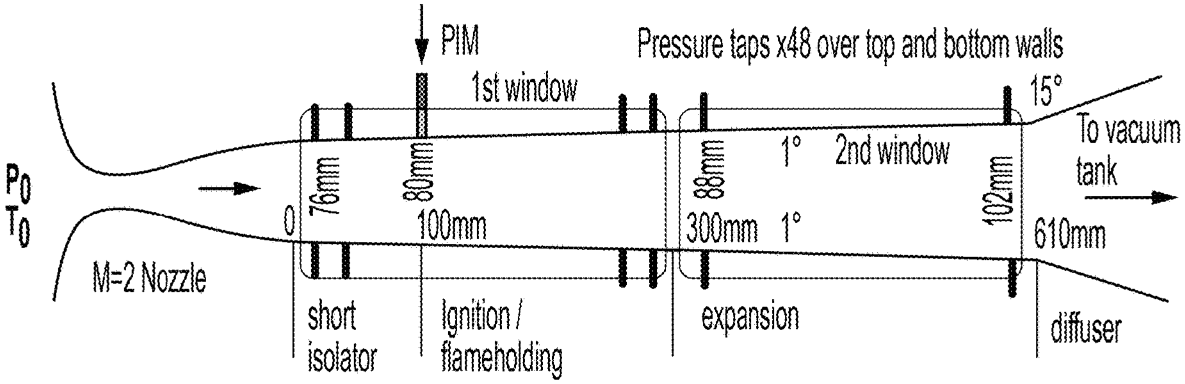
FIG. 11 is a schematic view of the test section for SBR-50 at the University of Notre Dame (straight combustor) for testing an example embodiment of a plasma injection module.
Figure 12:
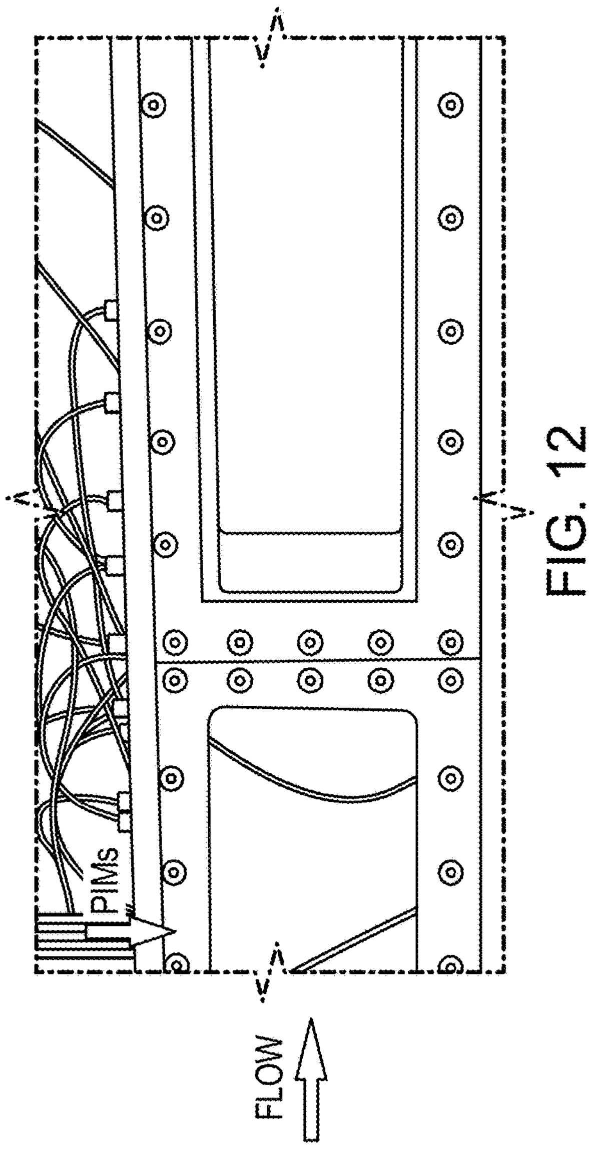
FIG. 12 is a side view of the test combustor of FIG. 11 illustrating testing of an example embodiment of a plasma injection module.
Figure 13:
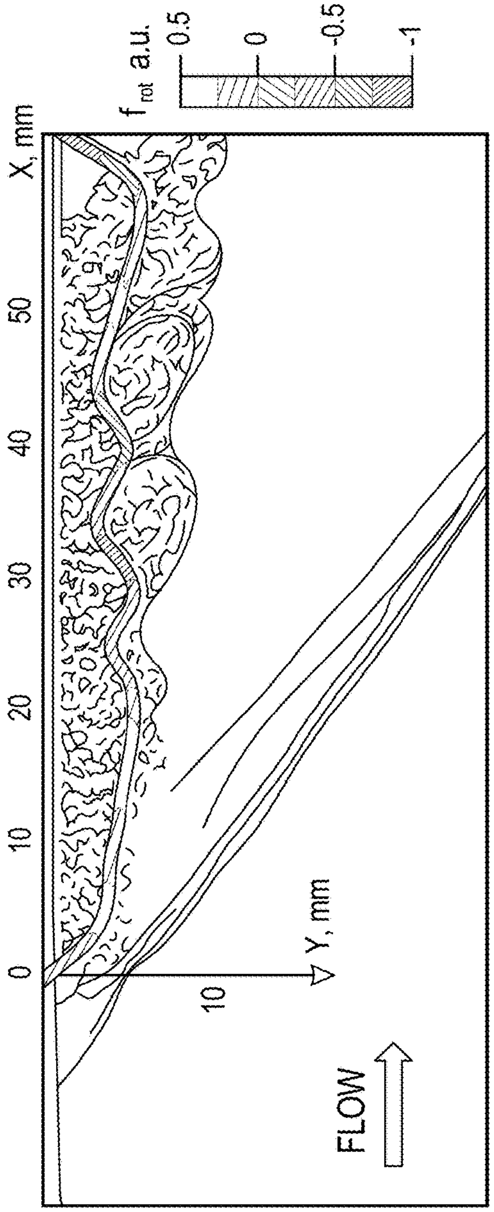
FIG. 13 is a side view of a plasma filament placed over a schlieren image of the fuel jet.

The experiments were performed in the supersonic blowdown wind tunnel SBR-50 at the University of Notre Dame. The combustor cross section at the exit of the converging-diverging nozzle was 76.2 mm in width (Y) and 76.2 mm in height (Z), with a 1o expansion half-angle and a total length (X) of 610 mm measured to the diffuser, as shown in FIG. 11. The fuel injectors and electrical discharge generators were flush-mounted on a plane wall as a single unit, indicated in FIG. 11 as "PIM"—Plasma-Injection Module. The test section of the SBR-50 high-speed combustion facility were equipped with two pairs of quartz windows placed as the side walls of the duct for optical access (FIG. 12). Ohmic heating was used to heat the air in the plenum chamber up to $T_0$=750 K, providing a non-vitiated oxidizer for the combustion chamber.

In the experimental examples, the combustion chamber was set to have the following conditions: initial Mach number (airflow) M=2; total pressure $P_0$=1-2.2 bar; stagnation temperature $T_0$=300-750 K, air mass flow rate $\dot{m}$air=0.5-2 kg/s; duration of steady-state aerodynamic operation t=1-2 s. Instrumentation available for this test includes: wall pressure taps; fast camera imaging Photron FastCam (b/w) and Casio EX-FH100 Camera (color); high-definition schlieren system; optical emission spectroscopy (OES) based on OceanOptics™ spectrometers, and a set of electrical probes.

Example 1: Plasma Morphology

The experiment was conducted to evaluate the possible role of plasma morphology on ignition of combustible material. In the experiment, the combustible material was ethylene and is in a range of fuel-to-total molecular number density ratio $NC_2H_4/N$=0.25-0.5, which corresponds to a rich mixture with equivalence ratio (ER) of 5-15. The ethylene is provided through a plasma injection module to form a fuel jet of ethylene.

Figure 14:
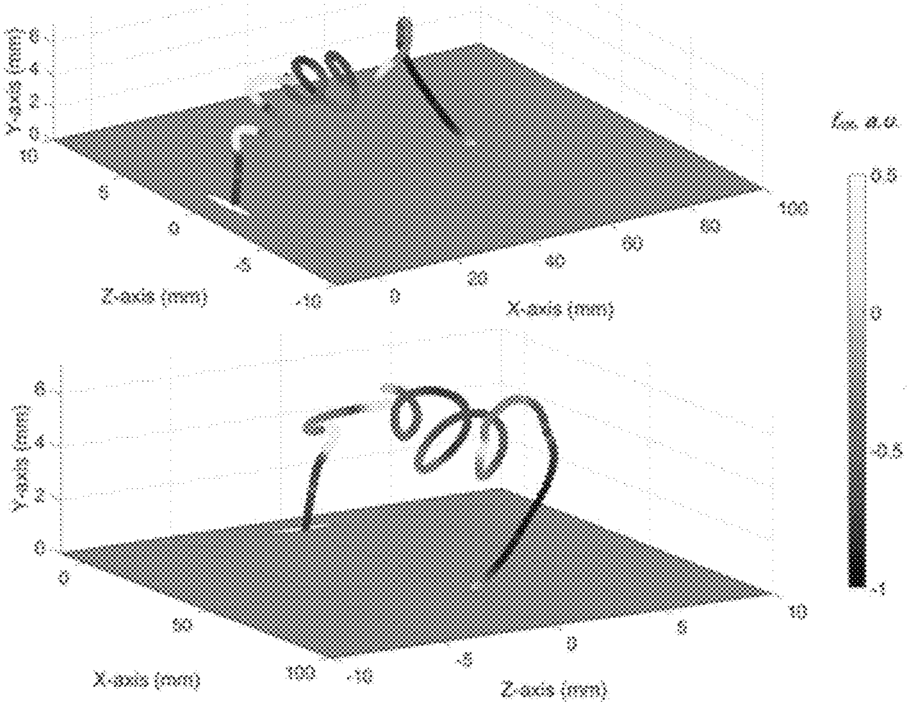
FIG. 14 illustrates a 3D reconstruction of the plasma filament with a vortical structure present from two different perspective views.

Three-dimensional reconstructions of plasma filaments revealed that the three major types of movement that the plasma filaments follow are vortex-induced rotation, fast side-to-side transition ("jump"), and curling back upstream in the vicinity of the filament connection to the grounded wall. The first coherent structure that was observed is a vortical behavior which manifests as a spiral shape of the plasma filament, as shown in FIGS. 14 and **15*a***.

When the plasma filament enters the highly turbulent portion of the fuel jet, the plasma filament shape and dynamics are governed by flow field rather than the configuration of the self-sustained electric field because ion drift is an order of magnitude slower than local convection movement of flow. Periodic oscillations (rotation) of the plasma filaments are observed, which is an essential feature of the plasma filaments' behavior. The effectiveness of plasma impact on the ignition and mixing can significantly varied depending on the filamentary plasma position in the flowfield.

Figure 15A:
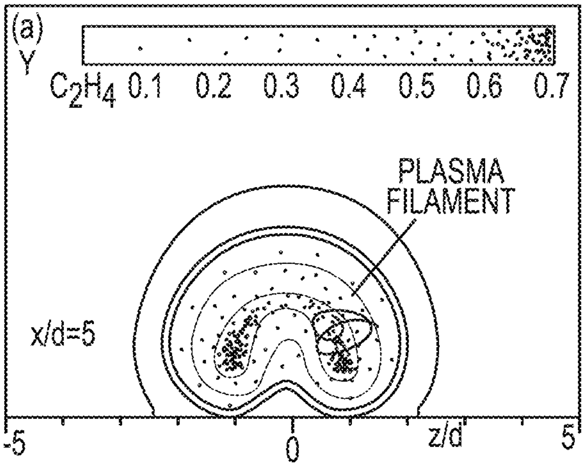
FIG. 15*a* illustrates the location of the vortical structured motion of the plasma filament relative to a fuel concentration map.
Figure 15B:
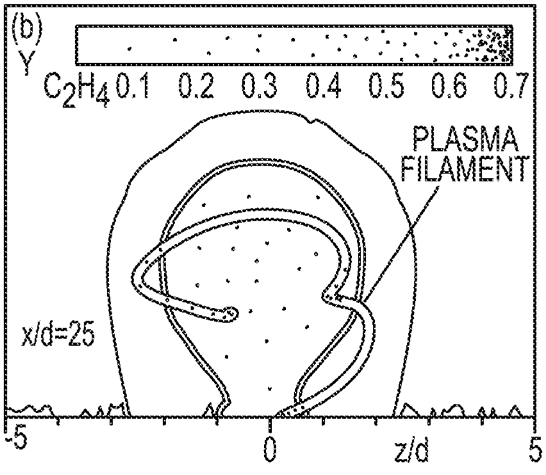
FIG. 15*b* illustrates the location of a jump structure of the plasma filament relative to a fuel concentration map.

FIGS. **15*a* and 15*b* illustrate the location of the plasma filament structure compared to the average fuel concentration in the fuel-air mixture. The location indicated as x/d=5 corresponds to distance x=15-35 mm from the fuel port. In this position, the plasma filament demonstrates the vortically structured motion. As seen in FIG. 15*a*, the vortical portion of the filament is located inside of the fuel jet and rotates near the relative concentration of ethylene. The second filament structure ("jump") is situated nearby the cross-section x/d=25 which corresponds to x=65-87 mm distance from the injection port in the current study. FIG. 15***b* shows the position of the "jump" pattern in relation to the ethylene fuel distribution inside of the fuel jet. Contrary to the vortical pattern shown in FIG. 16*a*, the "jump" pattern is located nearby/inside of the region with stoichiometric fuel-to-air ratio shown with the white line in the figure.

As a result, a conclusion drawn for the experiment is that the plasma filament is rarely located in the regions of maximum fuel concentration and never leaves the fuel jet into the freestream flow. The fuel-air mixing and the plasma filament/ignition source develop simultaneously. Due to intensive plasma-chemical kinetic processes, the ignition zone in the described plasma injection module 110, described with reference to FIG. 4-6, is located in the optimal position within the mixing layer for flame initiation.

This phenomenon, along with the much larger volume and energy deposition, can be utilized to widen the operational limits of a scramjet engine by providing enhanced ignition/re-ignition times, reducing the overall length of the combustor, and perhaps a higher combustion efficiency due to the enhanced mixing. The use of permanent magnets, as illustrated in the plasma injection module described with reference to FIGS. 4-6, add a significant rotating momentum to the plasma filament which leads to additional mixing intensification. Additionally, the external magnetic field is also beneficial to control the plasma filament of a plasma injection module, to reduce heating, and increase the volume of gas which interacts with the plasma filament.

Example 2: Pressure Distribution

The experiment was conducted to evaluate combustion and ignition while varying parameters such as flow pressure, the plasma power (i.e., from the voltage source), and fuel injection rates.

For this test series three modules (PIMs) were installed in the combustor (FIGS. 7-11). Electrical power was turned on for a duration of 0.1 to 0.2 s starting at nearly the same time as the beginning of the fuel injection and fuel injection continues for a short period of time after the end of the discharge. Ethylene was used as the fuel in this test series: the fuel mass flowrate was up to $\dot{m}C_2H_4$=8.5 g/s distributed through three plasma injection modules with a fuel nozzle diameter $d_f$=3.1 mm providing a subsonic/sonic jet with a jet-to-freestream momentum flux ratio (J) in the range 0.1 to 1 and an overall equivalence ratio (ER) in the range of 0 to 0.2.

With strong combustion, a zone of bright luminescence concentrates close to the plasma injection modules (FIG. 12), whereas with weak combustion and partial oxidation there appears a long tail of luminosity in a zone far from the plasma injection modules. For realization of strong combustion mode, the plasma power was sufficiently high, in a range of $W_{pl}$=10-20 kW for M=2, $P_0$=1.7 bar, $T_0$=300 K, and $\dot{m}C_2H_4$=2-8 g/s. Increasing the pressure, fuel mass flow rate, or flow velocity requires higher plasma power. For hydrogen combustion the power threshold is significantly lower.

Figure 1A:
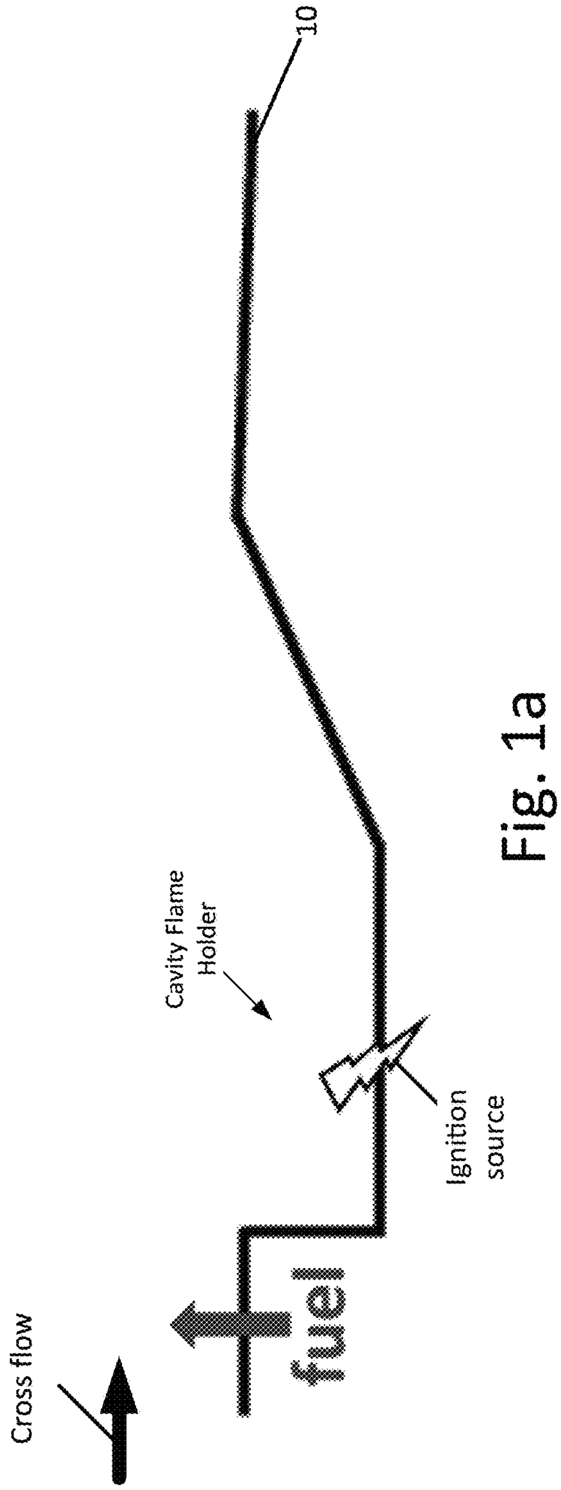
Fig. 1a Prior art
FIG. 1*a* is a simple schematic view of a fuel injection/ignition system according to the prior art.
Figure 1B:
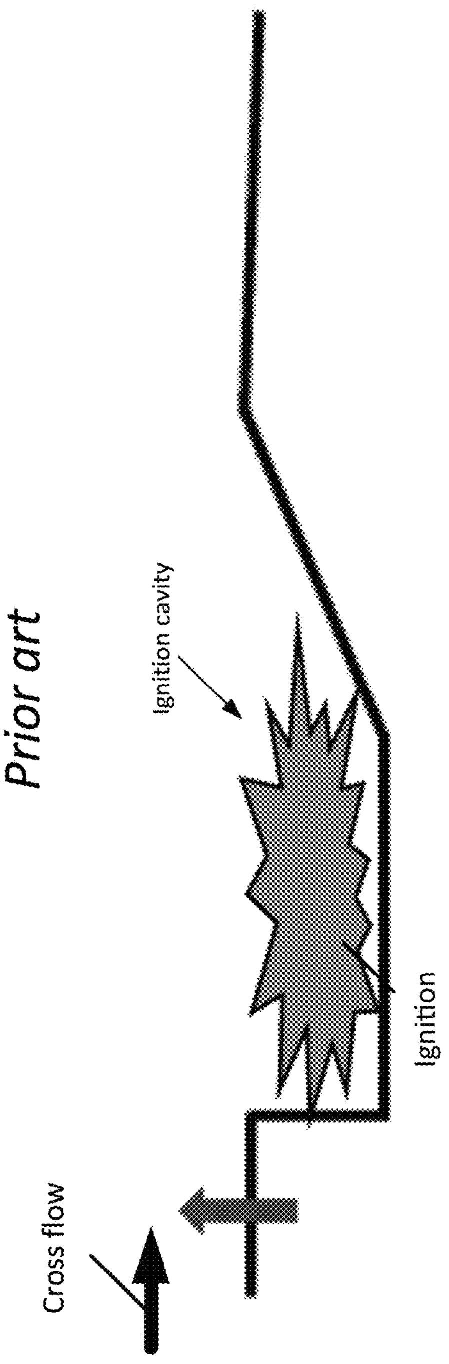
Fig. 1b Prior art
FIG. 1*b* is a simple schematic view of the fuel injection/ignition system of FIG. 1*a* during ignition.
Figure 2:
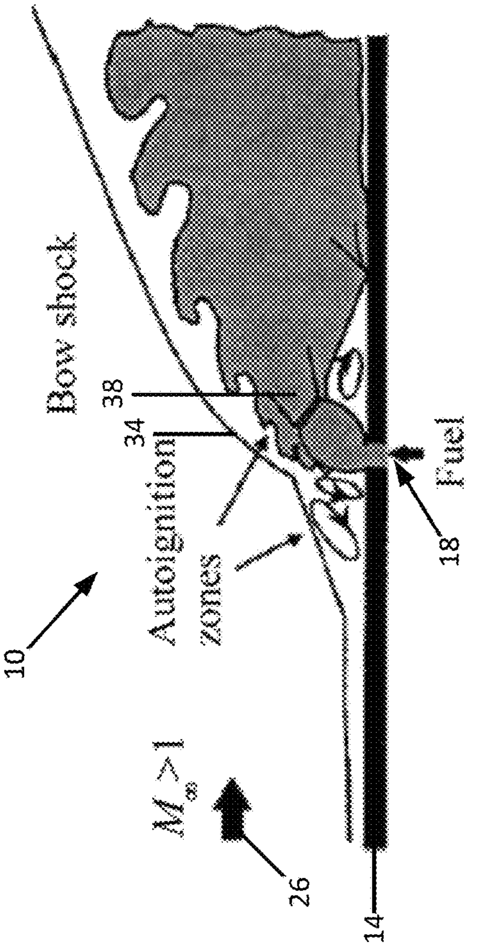
Fig. 2 Prior art
FIG. 2 is a schematic view that illustrates a typical flow structure at fuel injection into supersonic crossflow.
Figure 3A:
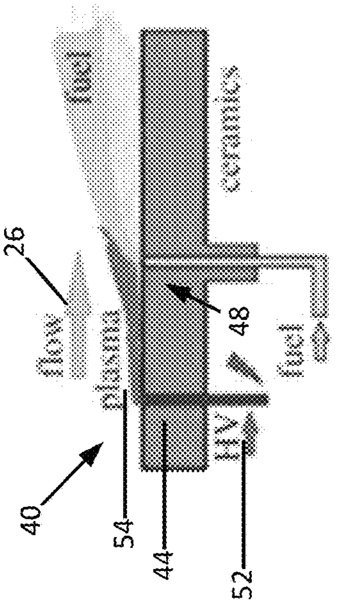
Fig. 3a Prior art
FIG. 3*a* is a schematic view of a previously studied plasma ignition pattern: a high voltage electrode positioned upstream of a fuel injection port.
Figure 3B:
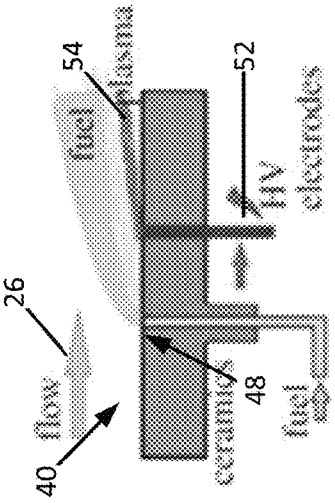
Fig. 3b Prior art
FIG. 3*b* is a schematic view of a previously studied plasma ignition pattern: a high voltage electrode positioned downstream of a fuel injection port.

The scheme of plasma assistance with the plasma-injection modules 110, as described in FIGS. 3-5, demonstrates significant benefits compared to the previously tested configurations with the electric discharge located both upstream (FIG. 3*a*) and downstream (FIG. 3*b*) of the fuel outlet. Specifically, it was determined that ignition and flameholding are observed over a wider range of flow parameters and fuel injection rates.

Figure 16A:
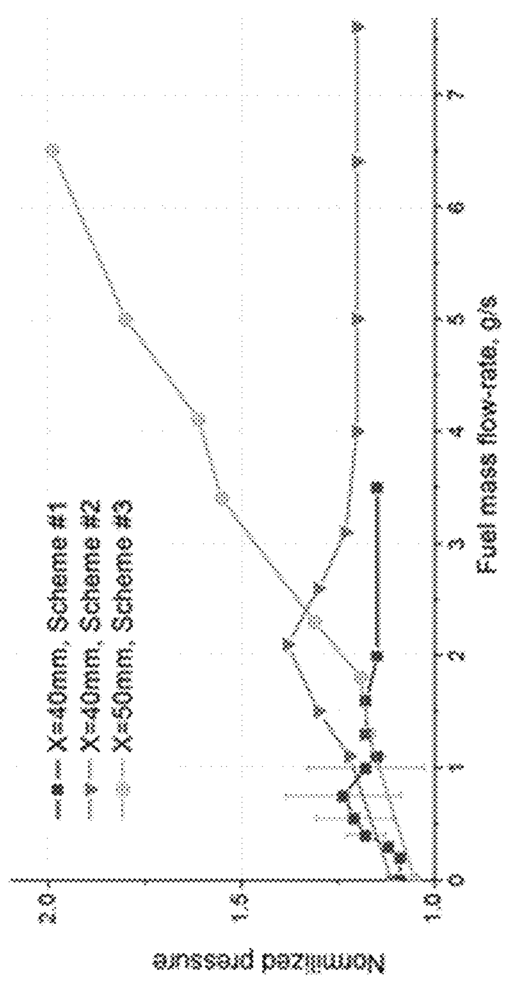
FIG. 16*a* is a chart illustrating pressure data (pressure increase ratio) depending on fuel mass flow rate to compare the traditional plasma ignition pattern of FIG. 3*a*, traditional plasma ignition pattern of FIG. 3*b*, and for the plasma injection module of FIG. 4 in locations proximate to the fuel injector.
Figure 16B:
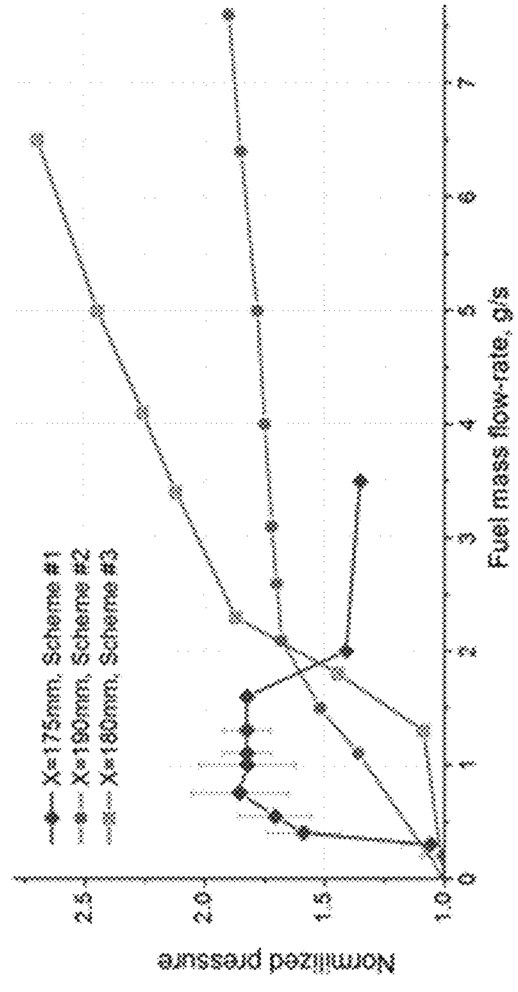
FIG. 16*b* is a chart illustrating pressure data (pressure increase ratio) depending on fuel mass flow rate to compare the traditional plasma ignition pattern of FIG. 3*a* (scheme #1), traditional plasma ignition pattern of FIG. 3*b* (scheme #2), and for the plasma injection module of FIG. 4 (scheme #3) in locations downstream the fuel injector.

FIGS. 16*a* and 16*b* illustrate a comparison of pressure data depending on fuel mass flow rate, obtained for the configuration with discharge generation upstream of the fuel injector (scheme #1—FIG. 3*a*), downstream of the fuel injector (scheme #2—FIG. 3*b*), and for the plasma injection module 100 (scheme #3—FIG. 4). The flow parameters (M=2, $P_{st}$=0.2-0.27 Bar) and discharge power ($W_{pl}$=12-18 kW) are similar in all cases, axial location X is measured from the fuel injection cross-section (i.e., the center of the discharge end 118 of the plasma injection module 100). FIG. 16*a* illustrates the pressure data in locations of measuring points in proximity of fuel injector, (i.e., a distance from x=40-50 mm). FIG. 16*b* illustrates the pressure data in locations in downstream zones (i.e., a distance from x=175-190 mm).

FIG. 16*a* and FIG. 16*b* demonstrates a remarkable difference between the performance of three schemes applied for plasma-based ignition and flameholding under conditions of low gas temperature, non-premixed composition, and low overall equivalence ratio, ER<<1. The scheme #1 exhibits more effective ignition at low fuel flow rates, $\dot{m}C_2H_4$<2 g/s. The last configuration scheme #3, however, shows much better performance at higher values of the fuel injection, $\dot{m}C_2H_4$>2 g/s, where the scheme #1 is limited to partial oxidation with fairly insignificant increase of pressure. To interpret this difference, two key moments need to be pointed out: (1) in scheme #1, the discharge was sustained in air, while in scheme #3 the discharge is sustained in the fuel (inside the axial fluid pathway 122 of the plasma injection module 100) as well as in the fuel-air mixture; and (2) the flow structure in the present configuration #3 is significantly different comparing to scheme #1.

Specifically, the near-surface quasi-DC electric discharge used in scheme #1 produces a "closed" flow separation zone (a separation bubble) downstream of the discharge, with high concentrations of chemically active species, such as atomic oxygen (O) and electronically/vibrationally excited nitrogen ($N_2$*). The fuel, after being injected into this zone, has sufficiently long residence time to mix with plasma-activated air and ignite.

After ignition, the volume of this zone increases and forms an extended subsonic flow zone without obvious reattachment downstream. At further increase of fuel injection, a local concentration of the fuel in separation zone exceeds the rich limit of ignition. In contrast to this pattern, in the scheme #3 the discharge is localized along the fuel injection jet, which generates reactive species and radicals, such as H, CH, $C_2H_3$, etc., by electron impact, and enhances mixing by convecting the unstable plasma filament with the injection jet. Based on the present results, it appears that plasma filament convection with the flow becomes significant only at sufficiently high fuel injection speed, comparable with the main airflow velocity.

It should be understood that the disclosure is not limited in its application to the details of construction and the arrangement of components in the instant disclosure or corresponding drawings. The disclosure is capable of other embodiments and of being practiced or of being carried out in various ways.

What is claimed is:

1. A plasma injection module comprising:

a fuel receiving end configured to receive a combustible material;

a discharge end opposite the fuel receiving end;

an axial fluid pathway extending between the fuel receiving end and the discharge end;

an insulator assembly defining a first portion of the axial fluid pathway proximate to the fuel receiving end;

an injection tube assembly positioned downstream of the insulator assembly, the injection tube assembly coupled to the insulator assembly, the injection tube assembly including:

an injection tube defining a second portion of the axial fluid pathway adjacent to the discharge end, the injection tube formed of an electrically conductive material;

an insulating tube disposed around a portion of the injection tube proximate to the discharge end; and a nozzle surrounding the injection tube, the nozzle defining a fuel discharge opening proximate the discharge end;

a voltage input connection arranged between the insulator assembly and the injection tube assembly, the voltage input connection being configured to secure a voltage source to the injection tube to form a plasma filament within and adjacent to the axial fluid pathway;

a flow inducing device coupled to the injection tube via the insulating tube proximate to the discharge end such that the insulating tube is interposed between an outer periphery of the injection tube and an inner surface of the flow inducing device; and a containment tube disposed around the flow inducing device, the insulating tube, and the portion of the injection tube, the containment tube configured to secure the insulating tube and flow inducing device to the portion of the injection tube downstream of the voltage input connection.

2. The plasma injection module of claim 1, wherein the flow inducing device is a permanent magnet arranged annularly about the injection tube.

3. The plasma injection module of claim 2, wherein, the insulating tube is a first insulating tube, the injection tube assembly further comprising:

a second insulating tube surrounding the first insulating tube and the permanent magnet, the containment tube surrounding the injection tube, the first and second insulating tubes, the permanent magnet, and the nozzle, the containment tube configured to secure the injection tube, the first and second insulating tubes, the permanent magnet, and the nozzle.

4. The plasma injection module of claim 3, wherein the nozzle is formed as a portion of the second insulating tube adjacent the discharge end of the plasma injection module.

5. The plasma injection module of claim 1, wherein the flow inducing device is a cylindrical magnet configured to provide a tangential component to a movement of the combustible material to produce a swirling pattern of a flow field of the combustible material.

6. The plasma injection module of claim 1, wherein the plasma injection module is configured to be coupled to a combustor having one or more fuel ports positioned on a flowside wall, wherein the nozzle of the plasma injection module is flush-mounted with the flowside wall of the combustor.

7. The plasma injection module of claim 6, wherein the flow inducing device, during operation, interacts with the plasma filament to cause rotation of the plasma filament and increase an area of ignition between the plasma filament and the combustible material to generate a highly reactive material at the discharge end.

8. The plasma injection module of claim 1, further comprising a connection assembly positioned between the insulator assembly and the injection tube assembly, and wherein the connection assembly defines a third portion of the axial fluid pathway.

9. The plasma injection module of claim 8, wherein the connection assembly further comprises a compression ring, a compression seat, and a connection tube coupling the compression ring to the compression seat.

10. The plasma injection module of claim 1, wherein the insulator assembly further comprises:

a first connection sleeve configured to receive the combustible material;

an insulator coupled to and downstream of the first connection sleeve; and a second connection sleeve coupled to and downstream of the insulator.

11. A plasma injection module, comprising:

a fuel receiving end configured to receive a combustible material;

a discharge end opposite the fuel receiving end;

an axial fluid pathway extending between the fuel receiving end and the discharge end, an insulator assembly defining a first portion of the axial fluid pathway proximate to the fuel receiving end;

a connection assembly positioned downstream of the insulator assembly and defines a second portion of the axial fluid pathway, an injection tube assembly positioned downstream of the insulator and the connection assembly, the injection tube assembly coupled to the insulator assembly via the connection assembly, the injection tube assembly including:

an injection tube defining a third portion of the axial fluid pathway adjacent to the discharge end, the injection tube formed of an electrically conductive material;

an insulating tube arranged annularly about a portion of the injection tube proximate to the discharge end;

a permanent magnet arranged annularly about the portion of the injection tube proximate to the discharge end, the insulating tube interposed between the portion of the injection tube and the permanent magnet; and a nozzle surrounding the injection tube and the permanent magnet, the nozzle defining a fuel discharge opening proximate the discharge end;

a voltage input connection arranged downstream of the insulator assembly and the connection assembly and upstream of the injection tube assembly, the voltage input connection being configured to secure a voltage source to the injection tube to form a plasma filament within and adjacent to the axial fluid pathway; and a containment cap or a tube disposed around the permanent magnet, the insulating tube, and the portion of the injection tube, the containment cap or the tube configured to secure the insulating tube and permanent magnet to the portion of the injection tube proximate the discharge end and downstream of the voltage input connection.

12. The plasma injection module of claim 11, wherein the connection assembly further comprises a compression ring, a compression seat, and a connection tube coupling the compression ring to the compression seat; and wherein during operation the permanent magnet produces a magnetic field that interacts with the plasma filament to rotate the plasma filament and increase an area of ignition between the plasma filament and the combustible material at the discharge end.

13. The plasma injection module of claim 12, wherein the insulator assembly further comprises:

a first connection sleeve configured to receive the combustible material;

an insulator coupled to and downstream of the first connection sleeve; and a second connection sleeve coupled to and downstream of the insulator.

14. The plasma injection module of claim 13, wherein the insulating tube is a first insulating tube, the injection tube assembly further comprising:

a second insulating tube surrounding the first insulating tube and the permanent magnet, the containment cap or the tube surrounding the injection tube, the first and second insulating tubes, the permanent magnet, and the nozzle, the containment cap or the tube configured to secure the injection tube, the first and second insulating tubes, the permanent magnet, and the nozzle.

15. The plasma injection module of claim 14, wherein the nozzle is formed as a portion of the second insulating tube adjacent the discharge end of the plasma injection module.

16. The plasma injection module of claim 11, wherein the permanent magnet is a cylindrical magnet, the cylindrical magnet configured to provide a tangential component to a movement of the combustible material to produce a swirling pattern of a flow field of the combustible material.

17. An ignition system comprising:

a combustor having one or more fuel ports positioned on a flowside wall, and a plasma injection module coupled to the combustor, the plasma injection module comprising:

a fuel receiving end configured to receive a combustible material;

a discharge end opposite the fuel receiving end, the discharge end being positioned proximate the flowside wall;

an axial fluid pathway extending between the fuel receiving end and the discharge end;

an insulator assembly defining a first portion of the axial fluid pathway proximate to the fuel receiving end;

an injection tube assembly positioned downstream of the insulator assembly, the injection tube assembly coupled to the insulator assembly, the injection tube assembly including:

an injection tube defining a second portion of the axial fluid pathway adjacent to the discharge end, the injection tube formed of an electrically conductive material; and a nozzle surrounding the injection tube, the nozzle defining a fuel discharge opening proximate the discharge end;

a voltage input connection arranged between the insulator assembly and the injection tube assembly;

an insulating tube disposed around a portion of the injection tube proximate to the discharge end;

a flow inducing device coupled to the injection tube proximate to the discharge end via the insulating tube; and a containment tube disposed around the flow inducing device, the insulating tube, the portion of the injection tube, and the nozzle, the containment tube configured to secure the flow inducing device, the insulating tube, the portion of the injection tube, and the nozzle relative to each other downstream of the voltage input connection.

18. The ignition system of claim 17, wherein the voltage input connection includes a voltage source operably coupled to the injection tube, the nozzle of the plasma injection module is flush-mounted with the flowside wall of the combustor, wherein rotation of a plasma filament prevents the plasma filament from maintaining a single connection point between the voltage source and the flowside wall of the combustor.

19. The ignition system of claim 17, wherein the flow inducing device is a permanent magnet arranged annularly about the injection tube.

20. The ignition system of claim 17, wherein the plasma injection module further comprises a connection assembly positioned between the insulator assembly and the injection tube assembly, and wherein the connection assembly defines a third portion of the axial fluid pathway;

wherein the flow inducing device, during operation, interacts with a plasma filament to rotate the plasma filament and increase an area of ignition between the plasma filament and the combustible material to generate a highly reactive material at the discharge end; and the voltage input connection being configured to secure a voltage source to the injection tube to form a plasma filament within and adjacent to the axial fluid pathway.

* * * * *